June 12, 1945.  S. P. MILLER  2,378,314
PROCESS FOR CARRYING OUT CONTINUOUS FUSION REACTIONS
Filed Aug. 12, 1941
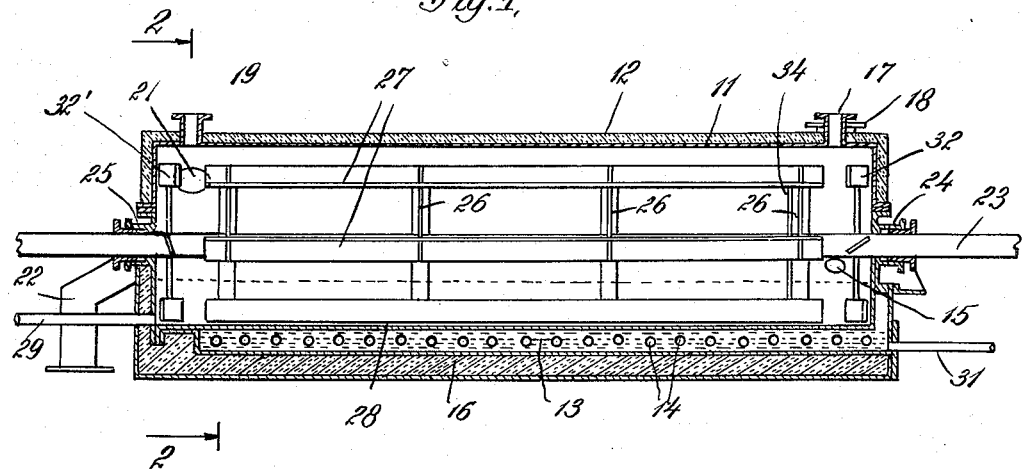
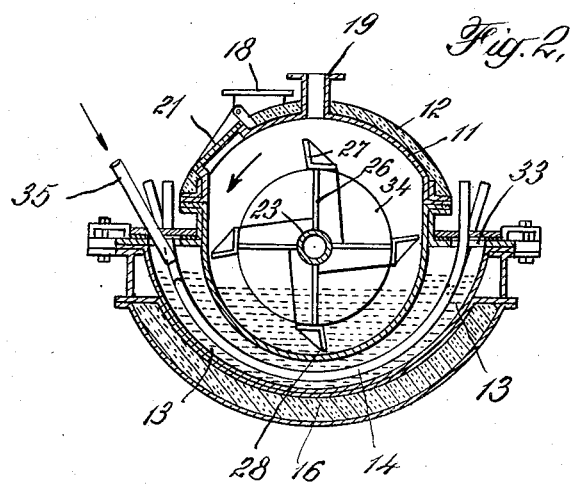
INVENTOR
Stuart P. Miller
BY Robert B Clark
ATTORNEY Patented June 12, 1945

2,378,314

UNITED STATES PATENT OFFICE 2,378,314

PROCESS FOR CARRYING OUT CONTINUOUS FUSION REACTIONS

Stuart P. Miller, Scarsdale, N. Y., assignor, by mesne assignments, to Allied Chemical & Dye Corporation, a corporation of New York Application August 12, 1941, Serial No. 406,511

3 Claims. (Cl. 260—628)

This invention relates to an improved method for continuously carrying out fusion reactions. More particularly, this invention relates to an improved method for continuously fusing sodium benzene sulfonate with sodium hydroxide to produce sodium phenolate.

It has been customary to carry out fusion reactions, such as the fusion of sodium hydroxide with sodium benzene sulfonate, batchwise rather than continuously. Such batchwise operation involves manifest disadvantages. In the first place, it is relatively ineconomical in that it requires reheating the fusion pot each time a new charge is to be treated with consequent loss in time and departure from optimum conditions, and does not permit closely co-ordinating the fusion step with any subsequent operation to which the product of the fusion reaction may be subjected. In many cases, carrying out the fusion reaction batchwise necessarily prevents applying the optimum heating time to all portions of the reaction mixture, since in many fusion reactions the reactants must be added gradually to maintain the desired control over the reaction, and hence the materials first introduced will be heated too long, while those last added will be heated too short a time; consequently, the yield and quality of the product are impaired. Finally, when batchwise operations are employed much larger and correspondingly more expensive vessels must be used and more labor is required to obtain the same rate of production as could be secured by using smaller vessels in continuous operation.

It is an object of this invention to provide an improved method for continuously carrying out fusion reactions.

It is a more specific object of this invention to provide an improved process for the continuous fusion of sodium benzene sulfonate and sodium hydroxide.

I have discovered that continuous fusion reactions may be carried out in a manner which avoids the above disadvantages by conducting the fusion in a jacketed reaction vessel, maintaining in the jacket a supply of one of the reactants at a temperature sufficiently high to maintain the fusion mass at the desired reaction temperature, and continuously adding hot reactant from the supply in the jacket to the fusion mass. The preferred embodiment of the invention involves the fusion of aromatic sulfonates, particularly sodium benzene sulfonate, with alkali metal hydroxides, particularly sodium hydroxide, to yield the alkali metal salts of the corresponding aromatic hydroxy compounds and is carried out in a vessel surrounded by a jacket in which is disposed a bath of the molten alkali metal hydroxide at a temperature sufficiently high to maintain the fusion mass at the desired reaction temperature, appropriate quantities of the molten hydroxide being continuously passed from said jacket through suitable ports in the walls of the vessel to the fusion mass to supply the required amounts of this reactant to the reaction mixture. By operating in accordance with my invention a supply of hot reactant, preheated to the proper temperature, is provided convenient to the reaction zone, thus simplifying operating technique by obviating the necessity of maintaining a supply of the hot reactant in a vessel separate from the reaction vessel. Furthermore, excellent temperature control and uniform heating of the fusion mass may be realized since heat is supplied thereto both indirectly, through the walls of the vessel, and directly, by means of the hot reactant added thereto; moreover, the transfer of heat from an external source to the reaction vessel is expedited by employing a moving heat transfer medium in the jacket, thus minimizing the formation of heat-resistant films on equipment, the effect of which is more pronounced when a stagnant heat transfer medium is used. In addition, since the heat transfer medium in the jacket is one of the reactants, the development of leaks in the reaction vessel, with the consequent mixing of the reaction mixture and heat transfer medium, will not cause dangerous or undesirable side reactions to develop; in fact, equipment which has developed leaks may, in accordance with this invention, be operated until it is found convenient to interrupt operations to make the necessary repairs. Hence, it will be evident that my invention provides a method of carrying out fusion reactions which obviates the disadvantages inherent in batch operations by providing a continuous process which is simple and economical to operate.

In carrying out the preferred embodiment of my invention as applied to the fusion of sodium benzene sulfonate and sodium hydroxide, the reactants are preferably continuously introduced and the reaction product continuously withdrawn at rates such that the time provided for reaction is from about fifteen to about forty minutes and may be about twenty minutes; the temperature of the melt in the reaction zone is preferably maintained between about 320° and about 410° C., desirably at about 360° C.; in order to maintain this temperature within the reaction vessel it is usually desirable to maintain the sodium hydroxide in an insulated jacket surrounding the reaction vessel at a temperature between about 400° and about 500° C., for example about 450° C. The sodium benzene sulfonate may be continuously fed to the reaction zone in any desired manner; the molten sodium hydroxide is most suitably introduced into the reaction zone from the jacket through ports or other overflow means designed to transfer it from the jacket into said reaction zone, although, if desired, some of the sodium hydroxide required may be added in either molten or solid condition directly to the reaction zone without passing through the jacket. Preferably, an excess of sodium hydroxide equivalent to between about 10% and about 20%, preferably about 18%, above that theoretically required for reaction with sodium benzene sulfonate is present in the reaction zone.

In the accompanying drawing forming a part of this specification and showing for purposes of exemplification a preferred form of apparatus for carrying out this invention, without limiting the practice of the claimed invention thereto, Figure 1 is a vertical section through a preferred form of apparatus embodying this invention, and Figure 2 is a section taken at right angles to the section of Figure 1, i. e. along the line 2—2 of Figure 1.

Referring to Figure 1, reference numeral 11 indicates a closed, substantially trough-shaped reaction vessel which preferably may be of nickel, silver, or lined with these metals. This vessel is provided with suitable heat insulation, as indicated by reference numeral 12, to minimize heat losses. Heat is supplied to the vessel by means of the molten sodium hydroxide bath 13 maintained in molten condition by a plurality of spaced combustion tubes 14, each of which passes through the bath from side to side thereof, as clearly appears from Figure 2; electrical immersion heaters could also be employed for heating the bath. The combustion tubes 14 are each provided with a burner such as an oil or gas burner, the products of combustion thus produced passing through the tubes and leaving the tubes at the end thereof opposite the burner end. Vessel 11 is provided at a point somewhat above the level of the reaction mass and near the inlet end with port 15, through which the molten sodium hydroxide from bath 13 is permitted to flow as desired. The molten caustic soda bath 13 has been found to be an excellent heat transferring medium for maintaining the desired temperature conditions in the reaction zone. Bath 13 has the base portion thereof suitably insulated, as indicated by reference numeral 16, to minimize heat losses.

The top of the vessel at the feed end thereof is provided with two flanged nozzles 17 and 18; nozzle 17 may be connected to feed lines for supplying sodium benzene sulfonate to the reaction vessel, whereas nozzle 18 may be employed for feeding sodium hydroxide to the vessel in case addition directly to the vessel of this reactant is desired. The top of the discharge end of the trough-like vessel 11 is provided with a flanged nozzle 19 which may communicate with a suitable line through which vapors, such as steam, may escape from the reaction zone. This end of the reaction vessel is also provided with an opening 21 (Figure 2) equipped with a suitable cover, which opening may be employed for purposes of inspecting the contents of the reaction vessel. The discharge end of the vessel is also provided with a chute 22 projecting from an end wall thereof, through which the reaction product flows continuously from the reaction vessel.

A shaft 23 passes through stuffing boxes 24, 25 in the side walls of the vessel 11 and is suitably journaled for rotation in these side walls. At spaced points along the shaft, arms 26 are fixed thereon. Agitator paddles or blades 27, designed so as to lift solid material in the reaction mixture (sodium sulfite) to the level of overflow pipe 22 are welded or otherwise secured to the arms 26, preferably at an angle of about 15° thereto. These paddles extend the length of vessel 11 to within short distances of the ends thereof and are mounted so that when moved past the bottom wall of the vessel they just clear this wall; this small clearance is indicated by the reference numeral 28 in Figure 2. Shaft 23 also has fixed thereto circular baffle 34, the diameter of which is two or three inches less than the diameter of vessel 11; this baffle forces the reaction mixture to flow therearound toward the periphery of vessel 11, insuring adequate agitation thereof. Preferably, paddles 27 do not extend beneath nozzles 17, 18 since introduction of the reactants directly upon the paddles tends to cause caking to develop thereon; a space is therefore usually left between paddles 27 and the end of vessel 11 into which the reactants fall unhindered. On shaft 23, between the space under nozzles 17, 18 and the end of the vessel, are fixed fan-shaped blades 32 at a pitch of about 45°; these blades, upon rotation of shaft 23, force reactants introduced through nozzles 17, 18 and port 15 toward paddles 27. Furthermore, paddles 27 are preferably not extended to the discharge end of vessel 11, but are terminated short thereof to provide for space for insertion of a thermocouple well and to prevent slopping of the reaction material into discharge pipe 22; fan-shaped blades 32', fixed to shaft 23 at a pitch of about 15°, are disposed in this space to insure thorough mixing of the reaction mass before being discharged through pipe 22.

Rotation of shaft 23 moves the agitator blades 27 within the reaction vessel or zone 11 so as to agitate the reactants in a circumferential direction within the vessel, i. e. in a direction at right angles to the direction of flow, without, however, causing substantial agitation of the reactants in their direction of flow through the vessel from the inlet end to the discharge end thereof; as shown in the drawing, the direction in which the shaft is rotated is preferably such that the paddles 27 pass downwardly across port 15. Hence, throughout any section of the reaction mixture taken in a direction at right angles to the direction of flow of the reactants the reaction mixture is substantially homogeneous, but along the direction of flow the composition of the reaction mixture varies continuously from unreacted material at the inlet end to completely reacted material at the point where the reaction product is discharged into the pipe 22.

Vessel 11 is provided with a line 29 for withdrawing product for draining purposes. Line 31 communicates with the caustic soda bath 13 for the purpose of withdrawing caustic soda from this bath. Flake caustic could be fed in from the top of the bath through openings at 33 between combustion tubes 14, or molten caustic could be added through pipe 35, said openings and pipe being near the discharge end of the vessel.

While the above description refers to the practice of my invention in connection with the fusion of sodium benzene sulfonate and sodium hydroxide, it is to be understood that the invention is applicable wherever a continuous fusion process is being carried out and a hot preheated fluid reactant is being added to the reaction mixture either continuously or at regular intervals. Thus, for example, my invention is particularly applicable to fusion reactions of a nature similar to that of the one above described, such as, for example, reactions involving the fusion of sodium para-toluene sulfonate with sodium hydroxide to produce sodium para-cresolate, the fusion of potassium benzene meta-disulfonate and potassium hydroxide to produce potassium resorcinate, and the fusion of sodium beta-naphthalene sulfonate and sodium hydroxide to produce sodium beta-naphtholate. The conditions under which these fusions are carried out may vary somewhat from those set forth hereinabove in connection with the fusion of sodium benzene sulfonate and sodium hydroxide. Thus, for example, in the fusion of sodium para-toluene sulfonate with sodium hydroxide, the rates of introduction of reactants and withdrawal of product are preferably adjusted so that the reaction time is between about forty and about ninety minutes, e. g. about sixty minutes; the temperature of the melt in the reaction zone may be maintained between about 320° and about 380° C., preferably about 355° C. For optimum results, an excess of caustic of about 25% to about 40%, preferably about 30% to 35%, above that theoretically required for the reaction is employed. It is to be further understood that while the above drawing shows an apparatus for carrying out the fusion of sodium benzene sulfonate and sodium hydroxide found to be particularly suitable for this purpose, it is not intended to limit the practice of my invention to fusion reactions carried out in such a vessel, since vessels of different design and employing different means of agitation could be employed. Thus, for example, molten sodium hydroxide could be heated to the desired temperature in a separate vessel and then fed to the jacket, thus dispensing with the heater tubes, or the hydroxide could be partially heated in a separate vessel and then raised to the desired temperature in the jacket. Other modifications within the scope of this invention will be evident to those skilled in the art.

The following example is illustrative of the present invention. Amounts are given in parts by weight.

A composition containing sodium hydroxide and sodium benzene sulfonate, in the proportions of about 1,523 parts of the hydroxide to 3,285 parts of the sulfonate, the amount of sodium hydroxide representing an 18% excess over that theoretically required, was continuously supplied to a reaction zone maintained in a vessel heated by a surrounding bath of molten sodium hydroxide; the sodium hydroxide required for the reaction was supplied to the vessel from said bath through a suitable port in the vessel, the supply of sodium hydroxide in the bath being renewed as needed. The bath was maintained at a temperature of about 450° C. by means of heat supplied from an external source. The temperature at the inlet end of the reaction vessel was about 354° C. and the temperature at the discharge end was about 390° C. The rate of withdrawal of the reaction product was correlated to the rate of introduction of the reactants so that the reaction time amounted to about thirty minutes. As the reactants flowed through the reaction zone they were agitated with rotating agitator arms of the type above described. A 96% yield of sodium phenolate was obtained.

It will be noted that this invention provides a continuous process for carrying out fusion reactions, which process obviates the disadvantages of batch operations hereinabove pointed out; more specifically, a simplified fusion process is provided whereby excellent yields of sodium phenolate are obtained.

It is to be understood that reference throughout the specification and claims to "continuous" fusion reactions is intended to cover all fusion reactions wherein the product of the fusion is continuously produced and withdrawn from the reaction zone continuously or at regular intervals; the reactants may be added continuously or intermittently at regular intervals, as desired.

Since certain changes in carrying out the above process and in the constructions set forth, which embody the invention, may be made without departing from its scope, it is intended that all matter contained in the above description or shown in the accompanying drawing shall be interpreted as illustrative and not in a limiting sense.

I claim:

1. An improved process for carrying out continuous fusion reactions between aromatic sulfonates and alkali metal hydroxides which comprises continuously flowing the fusion mass through a jacketed reaction vessel, maintaining in the jacket a supply of molten alkali metal hydroxide at a temperature sufficiently high to maintain the fusion mass at the desired reaction temperature, and continuously adding molten hydroxide from the supply in the jacket to the fusion mass, the mass being agitated so as to avoid substantial disturbance thereof along the direction of its flow through said vessel.

2. An improved process for continuously fusing sodium benzene sulfonate with sodium hydroxide which comprises introducing sodium benzene sulfonate and sodium hydroxide into a jacketed reaction vessel, continuously flowing the fusion mass through said vessel, maintaining in the jacket a supply of molten sodium hydroxide at a temperature sufficiently high to maintain the fusion mass at the desired reaction temperature, and continuously adding molten sodium hydroxide from said jacket to said vessel so as to furnish the amount of hydroxide necessary for carrying out the fusion operation, the fusion mass being agitated so as to avoid substantial disturbance thereof along the direction of its flow through said vessel.

3. An improved process for continuously fusing sodium benzene sulfonate with sodium hydroxide which comprises introducing sodium benzene sulfonate and sodium hydroxide into a reaction vessel provided with an insulated jacket, continuously flowing the fusion mass through said vessel, maintaining in the insulated jacket a supply of molten sodium hydroxide at a temperature between about 400° and about 500° C. so as to maintain the fusion mass between about 320° and about 410° C., and continuously flowing molten hydroxide from said jacket into said vessel so as to maintain an excess thereof between about 10% and about 20% of that theoretically required in said fusion reaction, the fusion mass being agitated so as to avoid substantial disturbance thereof along the direction of its flow.

STUART P. MILLER.